Figure 1:
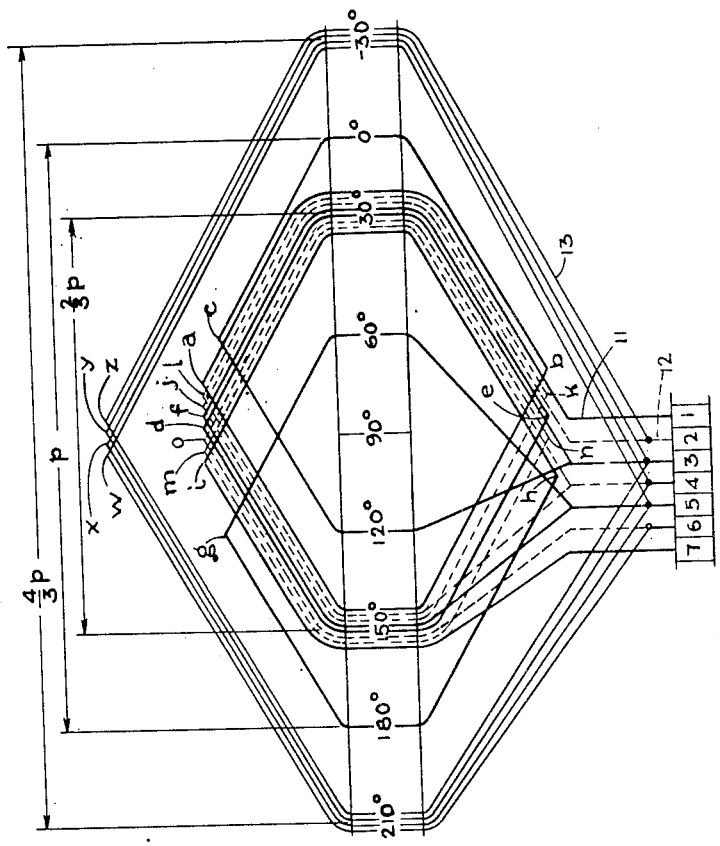

Aug. 2, 1949.　　　F. W. BAUMANN　　　2,477,951
DYNAMOELECTRIC MACHINE ARMATURE WINDING
Filed Feb. 21, 1948　　　3 Sheets-Sheet 1

Inventor:
Frederick W. Baumann,
by Braxell S. Mack
His Attorney.

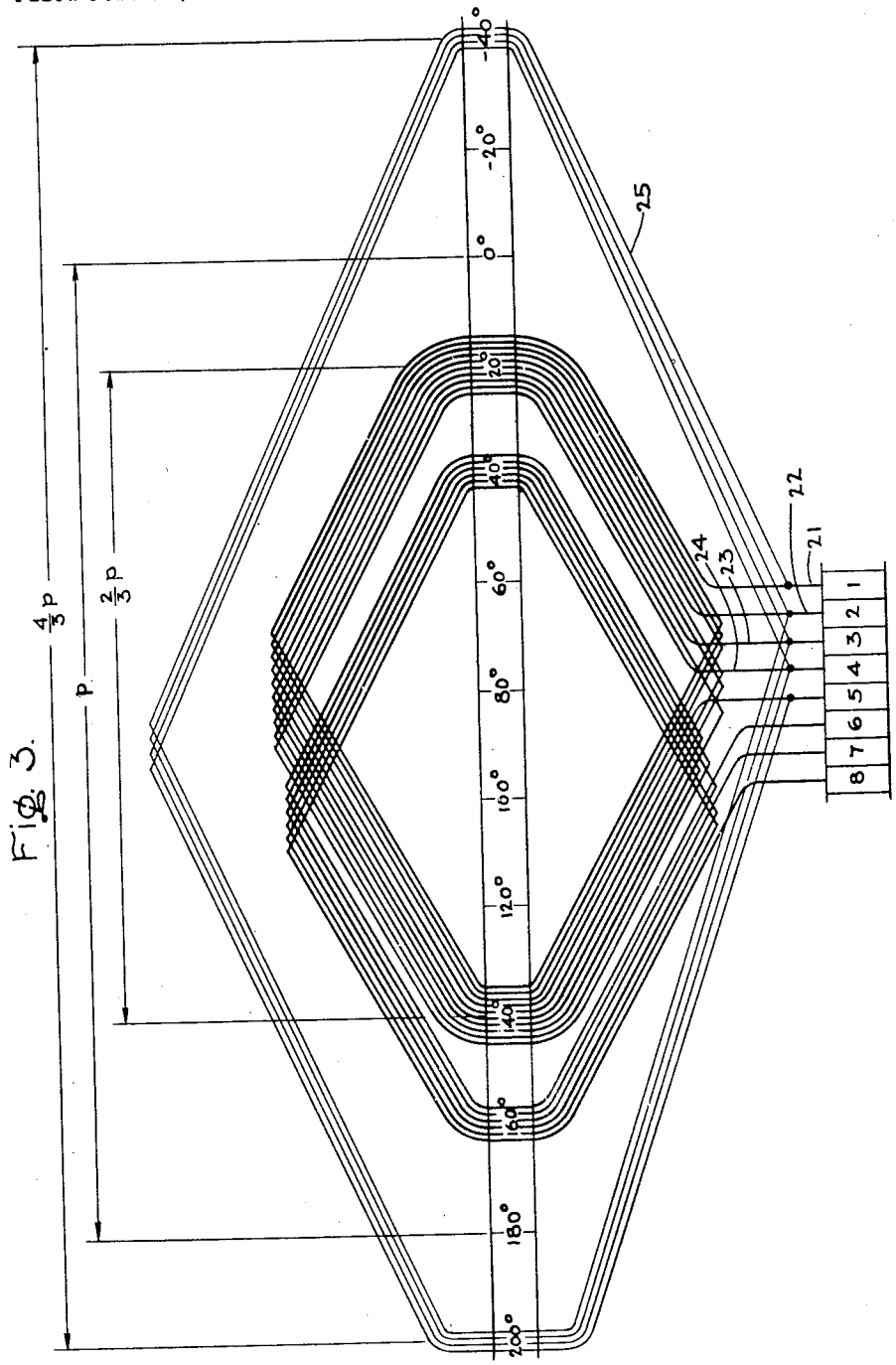

Aug. 2, 1949.  F. W. BAUMANN  2,477,951
DYNAMOELECTRIC MACHINE ARMATURE WINDING
Filed Feb. 21, 1948  3 Sheets-Sheet 3
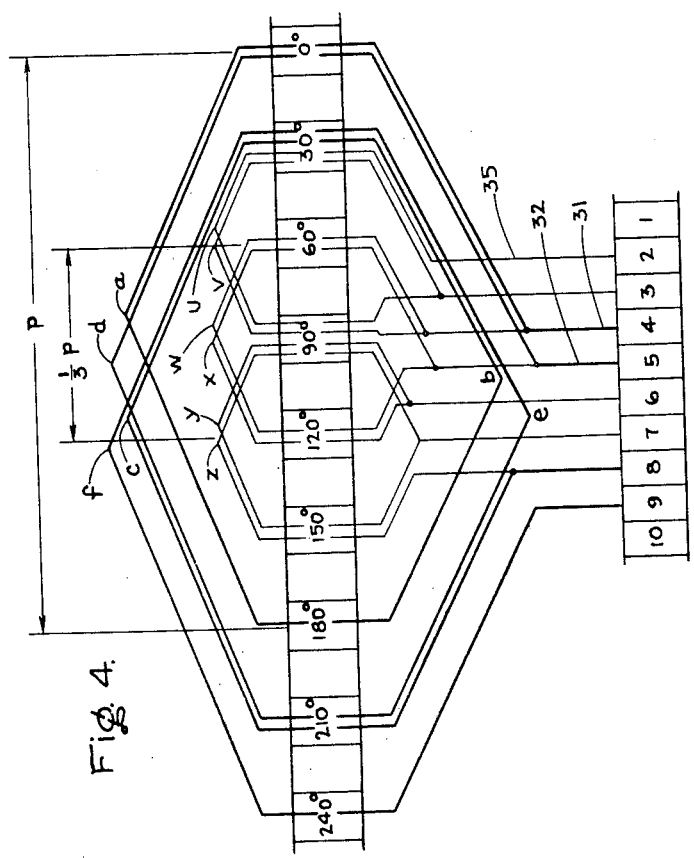
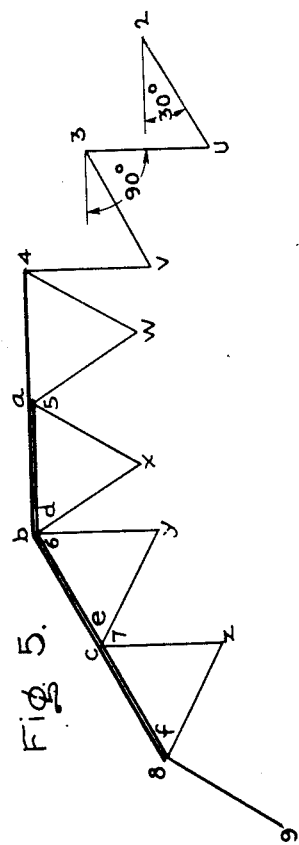
Inventor:
Frederick W. Baumann
by  *Purnell F. Mack*
His Attorney.

Patented Aug. 2, 1949

2,477,951

UNITED STATES PATENT OFFICE 2,477,951

DYNAMOELECTRIC MACHINE ARMATURE WINDING

Frederick W. Baumann, Schenectady, N. Y., assignor to General Electric Company, a corporation of New York Application February 21, 1948, Serial No. 9,998

8 Claims. (Cl. 171—252)

My invention relates to alternating current dynamoelectric machines of the type provided with a commutator and more particularly to such machines provided with a main commutated armature winding and an auxiliary commutated discharge winding.

In dynamoelectric machines of the commutator type adapted for alternating current operation, a problem is presented in that the output per pole is limited by the voltage induced between adjacent commutator segments. The brushes are generally shiftable so that the use of commutating poles is not feasible and, therefore, the output is limited by commutation problems which require dissipating the energy necessary to cause reversal of current in the coils during commutation.

Heretofore, various ways have been proposed for providing both a main commutated armature winding and an auxiliary commutated armature winding so that the latter can provide a discharge circuit for the former. For example, in United States Patent 2,143,713, January 10, 1939, to Robinson and assigned to the assignee of the present invention, both a main and an auxiliary commutated armature winding are used. The auxiliary winding is a high resistance, low inductance winding providing a discharge circuit and, by the arrangement and configuraton of the two windings, equal voltages are induced in their turns and circulating currents are avoided. By way of further example, in United States Patent 2,288,408, June 30, 1942, to Lane and assigned to the assignee of the present invention, there is described another method of arranging such windings to provide the desired discharge resistance effect. The Lane construction was intended as an improvement over the Robinson scheme in that the Lane idea could be used with a main winding of any multiplicity, whereas with the Robinson scheme the rating of the machine was limited to that of the simplex main winding. With both the Lane and the Robinson schemes, however, the number of turns of the main winding is limited to unity and considerable losses are encountered when such machines are operated.

The present invention is an improvement over the disclosure of these patents in that it provides means for reducing the losses (particularly those due to transformer voltage between segments under a brush) and thereby permits an increase in flux and consequently in the rating of the machine.

It is an object of the present invention to provide simple and inexpensive means for reducing the losses in a machine of the type described and thereby to make possible an increase in the rating of the machine.

It is a further object of the present invention to provide a dynamoelectric machine commutated auxiliary and main winding arrangement in which the auxiliary winding is adapted to act as a discharge and voltage equalizing circuit for the main winding regardless not only of the multiplicity of the main winding but of the number of turns thereof.

It is a still further object of the present invention to provide an improved construction which makes possible more satisfactory operation of such a machine.

A still further object of the present invention is to provide an improved winding arrangement in an A. C. commutator type dynamoelectric machine, said arrangement furnishing an efficient discharge circuit to allow a high machine output with the substantial elimination of commutator sparking.

Broadly the means employed in the embodiments herein illustrated and described comprises a main winding of any multiplicity and of any number of turns, and a simplex single-turn auxiliary discharge winding having a configuration and arrangement designed to provide a discharge circuit for the main winding and tie the multiple circuits of the main winding together at points of equal potential.

Figure 2:
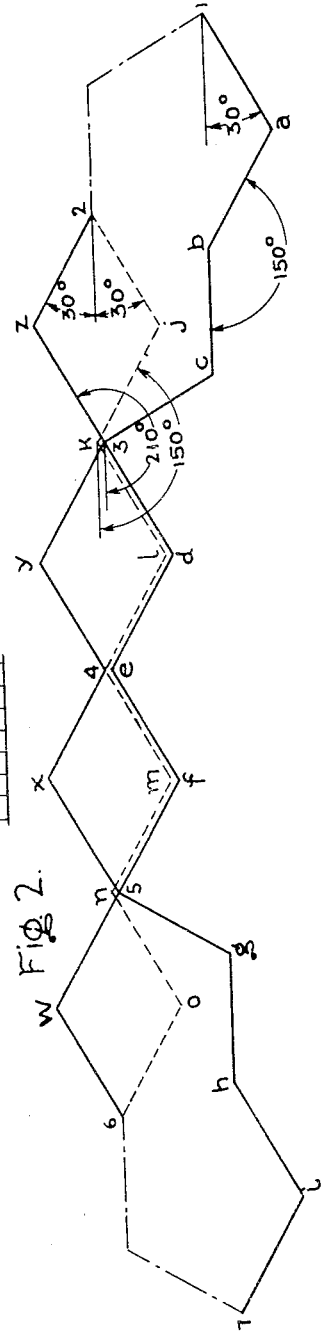

Other objects and advantages will become apparent and my invention will be better understood from consideration of the following description taken in connection with the accompanying drawing in which Fig. 1 represents a developmental view of a portion of a winding arrangement illustrating my invention applied to a two-turn duplex main winding; Fig. 2 is a vector diagram for Fig. 1; Fig. 3 is a developmental view of a portion of a winding arrangement illustrating my invention applied to a four-turn quadruplex main winding; Fig. 4 is a developmental view of a portion of a winding arrangement illustrating my invention applied to a two-turn quadruplex main winding; and Fig. 5 is a vector diagram for Fig. 4.

In Fig. 1 I have shown a developed view of a portion of a winding arrangement for a six-pole machine having 36 armature winding slots of which, in Fig. 1, 9 slots are shown identified by degrees corresponding to electrical degrees displacement (—30°, 0°, 30°, etc.). The machine is provided with a commutator having 144 commutator segments such as those marked 1–7, inclusive. The main armature winding is a duplex two-turn winding comprising half winding 11 and half winding 12 and there is also a simplex single-turn discharge winding 13.

Since the main winding is a duplex winding it is noncontinuous with the half 11 closing upon alternate commutating segments (such as 1, 3, 5, etc.) and the other half 12 closing upon the in-between segments (such as 2, 4, 6, etc.). If the multiplicity is represented by M, it is obvious that these winding halves close upon segments which are M apart. The number of turns of each multiple half may be represented by T. For the main winding of Fig. 1, then $M=2$ and $T=2$. For purposes of clarity, the half 11 has been shown solid and the half 12 has been shown dashed. The discharge winding 13 is preferably a high-resistance, low-inductance winding as indicated by the light solid line.

The number of slots per pole is chosen so that this number divided by three is integral so that the main winding may be placed in slots, as shown, to give it an average pitch of $\frac{2}{3}P$ and the discharge winding may be placed in slots, as shown, to give it a pitch of $\frac{1}{3}P$, where P represents the pole span as indicated by the dimensions at the top of Fig. 1.

It will be understood that the $\frac{2}{3}$ pitch of the main winding is determined by various design considerations unrelated to the present invention, but once such a pitch is chosen for a main winding of the type described (i. e. $M=2$ and $T=2$) it is desirable to use a single-turn simplex winding of $\frac{1}{3}$ pitch closing upon adjacent commutator segments, as shown, to provide an efficient discharge circuit for the main winding. Such an arrangement provides an auxiliary winding capable of acting as a low loss discharge for the main winding and also as a voltage equalizer. This is shown in Fig. 2, which represents in vector form the voltages which, due to fundamental flux, will be induced in the conductors of the winding 11—12 and the winding 13 of Fig. 1. For the purpose of cross reference from Fig. 1 to Fig. 2, the convolutes of the main winding have been marked a, b, c, etc., and the back ends of the auxiliary winding have been marked w, x, y, z. In Fig. 2, these same letters are used, together with numbers 1—7 corresponding to the commutator segments, to identify the vectors. It will be seen from Fig. 2 that the polygon of voltages due to the half duplex winding 11 (viz., 1—a—b—c—3, etc.) and the polygon of voltages due to the half duplex winding 12 (viz., 2—j—k—l—4, etc.—shown dashed) nearly correspond at the points 3 and 5 and may be brought into exact correspondence by the addition of the discharge winding 12 producing the polygon of voltages 2—z—3—y—4, etc.

In Fig. 3 I have shown a four-turn quadruplex main winding comprising the quarter windings 21, 22, 23 and 24 and a simplex single-turn discharge winding 25 for a six pole, 54 slot machine. Inasmuch as the number of turns of the main winding has increased (over the main winding of Fig. 1) in the same ratio as the multiplicity (both being doubled in Fig. 3 as compared to Fig. 1) the desired balance of voltages may be obtained by preserving the same ratio of discharge winding pitch to main winding pitch. Broadly, this ratio may be expressed by saying that where the pitch of the main winding is one minus any fraction, the pitch of the discharge winding is one plus the same fraction. In both Fig. 1 and Fig. 3 the fraction is $\frac{1}{3}$ so that there is a $\frac{2}{3}$ pitch main winding and a $\frac{4}{3}$ pitch discharge winding. Furthermore, the number of turns of the discharge winding connected across commutator segments which are M apart may be represent by D, and then, for any embodiment (Fig. 1, Fig. 3 or Fig. 4), D/M turns of the simplex discharge winding are connected to each commutator segment.

In Fig. 4 I have shown a developed view of a portion of a winding arrangement comprising a two-turn quadruplex main winding comprising quarter windings such as 31 and 32 having an average span equal to the pole pitch P, together with a single-turn simplex discharge winding 35. In order to provide the desired discharge and voltage equalizing effect, it is necessary that the discharge winding for this arrangement have a span of $\frac{1}{3}P$ as shown. This is confirmed by Fig. 5 which is a diagram for the vector voltages of the conductors of Fig. 4. Again the main winding convolutes and the auxiliary winding back ends have been lettered a, b, c, etc., and u, v, w, etc., so that Fig. 5 may be compared with Fig. 4.

It will be seen from Fig. 5 that the polygon of voltages due to the quarter quadruplex winding 31 (viz. 6—a—b—c—8) may be brought into correspondence with the polygon of voltages due to the quarter quadruplex winding 32 (viz., 5—d—e—f—9) by the polygon of voltages due to the discharge winding 35 (viz., 2—u—3—v—4—w, etc.).

With any of the schemes it is preferable to have the auxiliary winding of a different pitch than that of the main winding in order to suppress harmonics of other than fundamental frequency.

In operation the use of a discharge winding of the type herein described allows the use of multi-turn, as well as multiplex, main windings so that, for a required number of ampere turns, the main winding may be of relatively high resistance in a great number of turns so that there will be less losses and a fewer number of brushes for the same size motor.

The principal differences between my invention as described herein and the prior art is that the number of circuits of the load carrying winding may be increased and the number of turns in this winding may also be increased. For the same motor or generator rating, such an increase will allow a decrease in main winding current because, for the same rating, higher voltages may be used between segments. This is so because the multiplex winding may have a greater span than the brush, causing all circulating current through the brush to flow through the high resistance simplex path. This allows the use of a higher voltage per segment. The allowable decrease in main winding current causes a consequent decrease in watts loss due to load current. The exact reduction is a function of a great many elements such as brush drop, copper section, and other variables, but in general the circulating current loss for the same bar to bar voltage is reduced, in direct proportion to the increase in the number of turns and number of circuits.

With my invention as described above, the auxiliary winding, which acts both as a discharge and as a tie for the main winding portions, serves its proper function with a multiple multi-turn winding. The multiple main winding is advantageous because the multiplicity reduces the voltage between the commutator segments and, in addition, makes it less likely that any of the main circuits will be shorted by a single brush. The use of a multi-turn main winding allows less current to circulate in this winding for the same number of ampere turns of main winding. Yet, with the arrangement described, a single-turn simplex auxiliary winding serves to assure that there will be no out-of-balance voltages in the system.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An A. C. dynamoelectric commutator machine having a commutated main winding and a commutated auxiliary discharge winding, said main winding having a multiplicity, M, with the multiple parts thereof each having a plurality of turns, T, connected across commutator segments which are M—1 segments apart, said auxiliary discharge winding being a simplex winding having D turns thereof connected across commutator segments which are M—1 segments apart, with D/M turns of said simplex discharge winding connected to successive commutator segments and with the pitch of said simplex discharge winding arranged with respect to the pitch of said main winding so that the voltages induced by fundamental flux in D turns of said simplex winding is equal to the voltages induced by fundamental flux in T turns of said main winding.

2. An A. C. dynamoelectric commutator machine having a commutated main winding and a commutated auxiliary discharge winding, said main winding comprising a multiplex winding with the winding elements thereof each having a plurality of turns, and said auxiliary discharge winding comprising a simplex single-turn winding connected to all of said winding elements of said multiplex winding and having a pitch different than the pitch of said main winding.

3. An A. C. dynamoelectric commutator machine having a slotted armature with a commutated main winding and a commutated auxiliary discharge winding electrically connected to said main winding, said main winding being a multiple winding with the multiple portions thereof each having more than a single-turn in series between commutator segments, and said auxiliary discharge winding being a simplex single-turn winding of a different pitch than the pitch of said main winding and arranged in the slots of said armature to produce voltages of proper magnitude and direction to balance voltages produced in said main winding portions.

4. An A. C. dynamoelectric commutator machine having a commutated two-turn duplex main winding having a pitch factor of 1—N, where N is any fraction, and a commutated auxiliary simplex discharge winding having a pitch factor of 1+N and electrically connected to said main winding, whereby said auxiliary winding is adapted to act as a discharge and voltage-equalizing circuit for said two-turn duplex main winding.

5. An A. C. dynamoelectric commutator machine having a slotted armature, a commutated two-turn duplex main winding of ⅔ pitch factor in the slots of said armature, and a commutated auxiliary single-turn simplex discharge winding of ⅔ pitch factor arranged in slots of said armature and electrically connected to said main winding, whereby said auxiliary winding is adapted to act as a discharge and voltage-equalizing circuit for said duplex two-turn main winding.

6. An A. C. dynamoelectric commutator machine having a commutated four-turn main armature winding having a pitch factor of 1—N, where N is any fraction, and a commutated auxiliary simplex discharge armature winding having a pitch factor of 1+N and electrically connected to said main winding, whereby said auxiliary winding is adapted to act as a discharge and voltage-equalizing circuit for said quadruplex four-turn main winding.

7. An A. C. dynamoelectric commutator machine having a slotted armature, a commutated four-turn quadruplex main winding of ⅔ pitch factor in the slots of said armature, and a commutated auxiliary single-turn simplex discharge winding of ⅔ pitch factor arranged in slots of said armature and electrically connected to said main winding, whereby said auxiliary winding is adapted to act as a discharge and voltage-equalizing circuit for said quadruplex four-turn main winding.

8. An A. C. dynamoelectric commutator machine having a slotted armature, a commutated two-turn quadruplex main winding of full pitch factor in the slots of said armature, and a commutated auxiliary single-turn simplex discharge winding of ⅓ pitch factor arranged in slots of said armature and electrically connected to said main winding, whereby said auxiliary winding is adapted to act as a discharge and voltage-equalizing circuit for said quadruplex two-turn main winding.

FREDERICK W. BAUMANN.

REFERENCES CITED

The following references are of record in the file of this patent:

UNITED STATES PATENTS

| Number | Name | Date |
| --- | --- | --- |
| 2,143,713 | Robinson | Jan. 10, 1939 |
| 2,272,749 | Lane et al. | Feb. 10, 1942 |

OTHER REFERENCES

"Die Gleichstrommachine," Arnold, pages 67–68, Julius Springer, Berlin 1906.